Figure 5:
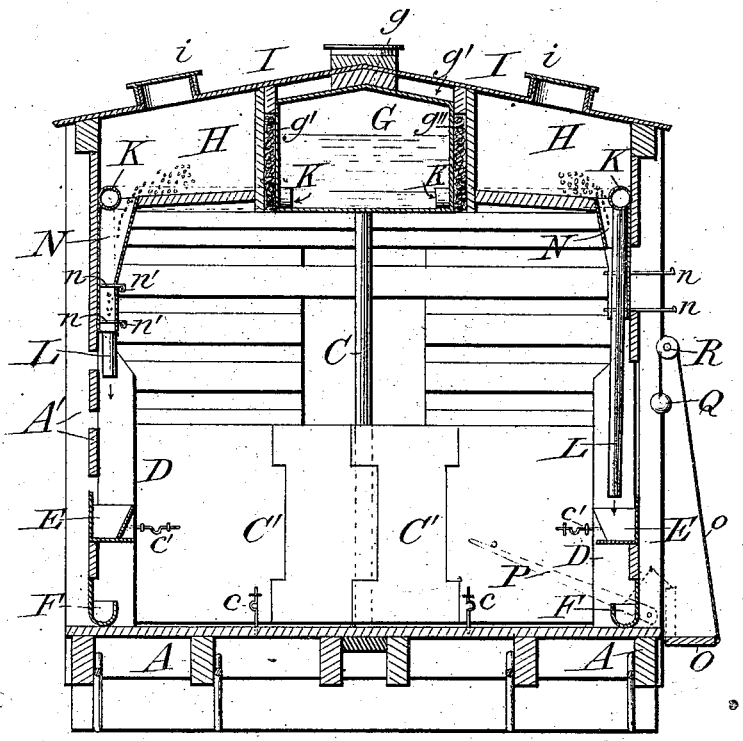

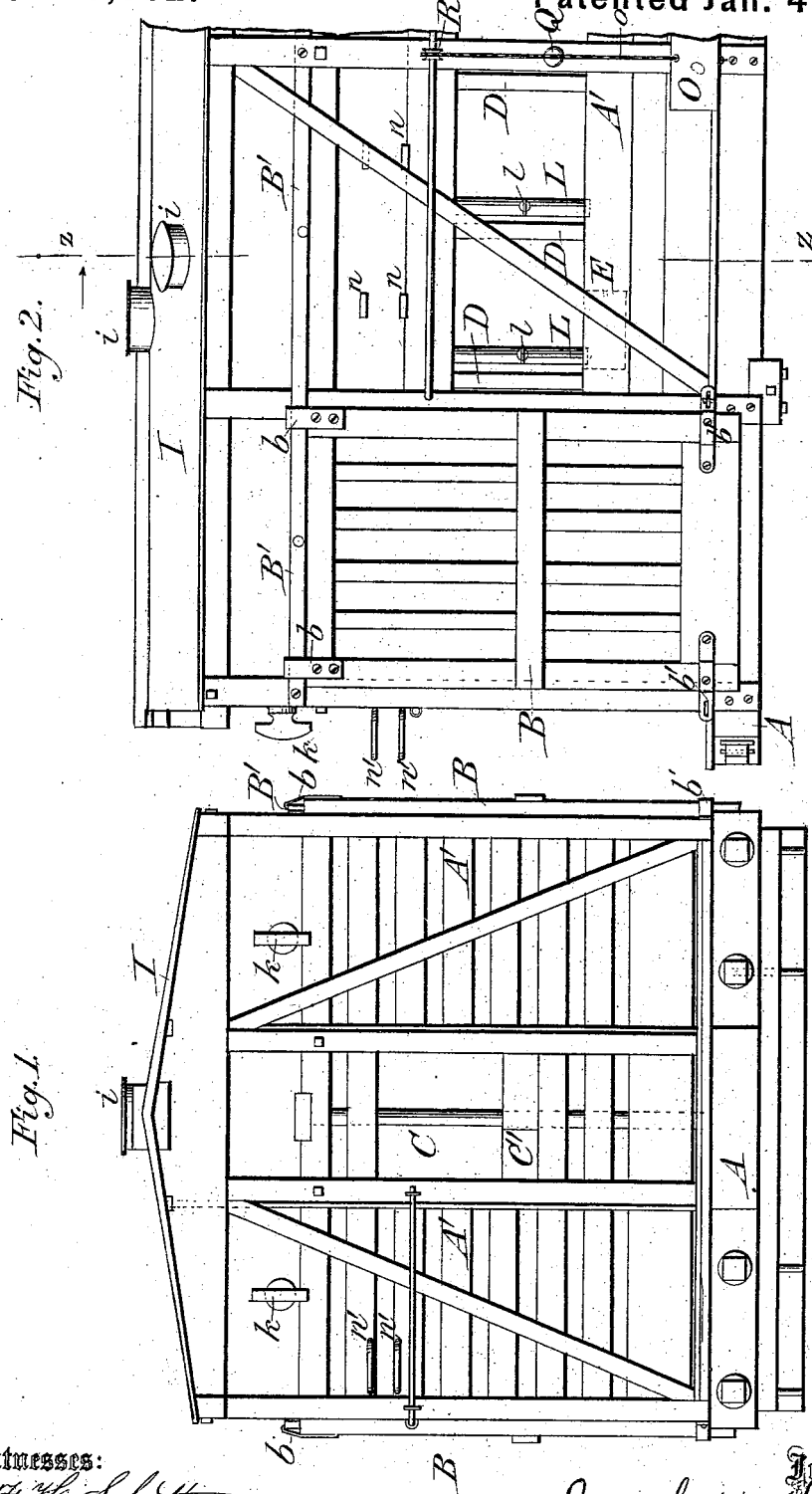
(No Model.)  3 Sheets—Sheet 1.
J. W. HUNT.
Stock Car.
No. 236,332.  Patented Jan. 4, 1881.
Witnesses:
F. H. Schott
A. R. Brown
Inventor
Josiah W. Hunt
Per C. H. Watson & Co. Attorneys.

(No Model.) 3 Sheets—Sheet 2.
J. W. HUNT.
Stock Car.
No. 236,332. Patented Jan. 4, 1881.
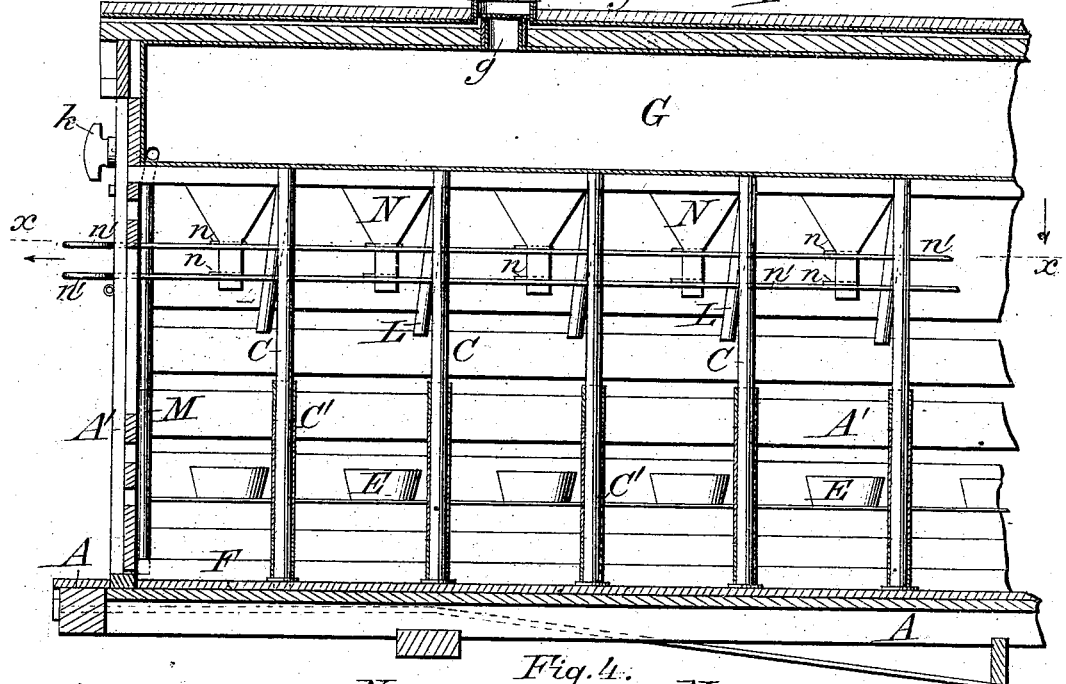
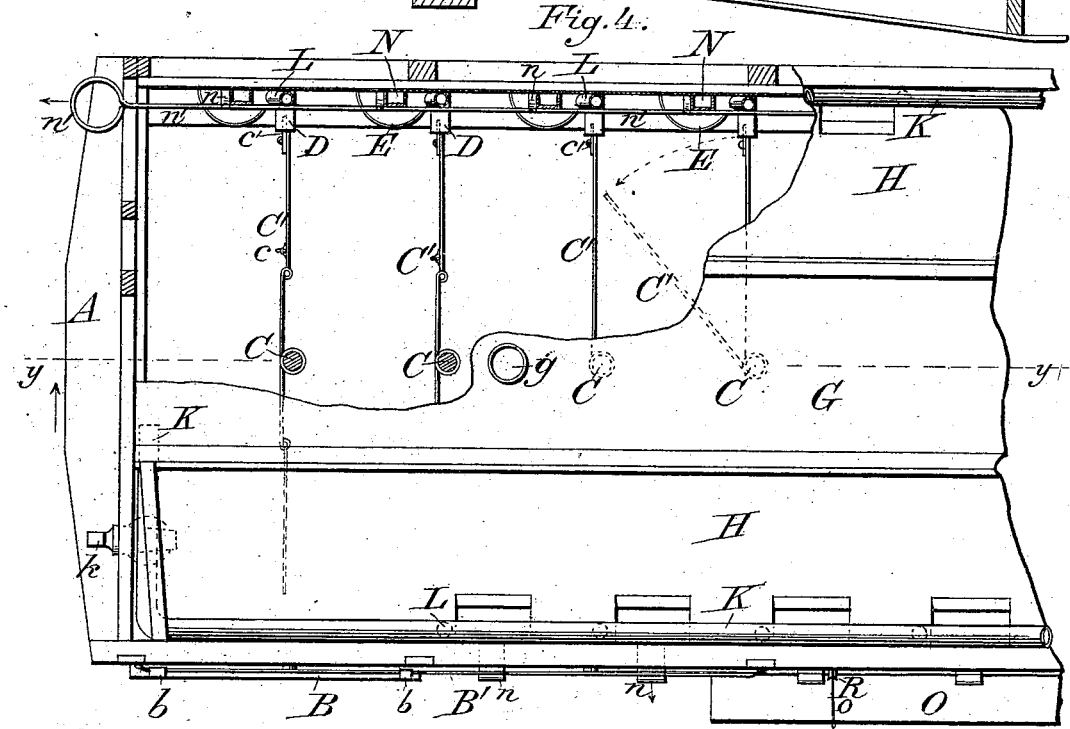
Witnesses:
H. H. Schott
A. R. Brown
Inventor
Josiah W. Hunt
Per C. H. Watson & Co. Attorneys.

(No Model.)

J. W. HUNT.
Stock Car.

No. 236,332.   Patented Jan. 4, 1881.

3 Sheets—Sheet 3.

Witnesses:
F. H. Schott.
A. R. Boren

Inventor
Josiah W. Hunt
Per C. H. Watson &Co. Attorneys.

UNITED STATES PATENT OFFICE.

JOSIAH W. HUNT, OF URBANA, OHIO.

STOCK-CAR.

SPECIFICATION forming part of Letters Patent No. 236,332, dated January 4, 1881.

Application filed November 13, 1880. (No model.)

*To all whom it may concern:*

Be it known that I, JOSIAH W. HUNT, of Urbana, in the county of Champaign and State of Ohio, have invented certain new and useful Improvements in Stock-Cars; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to that class of railway-cars in which live-stock may be transported in separate compartments, so as to prevent the animals from crowding or trampling upon each other; and the invention consists in a novel arrangement of swinging partitions designed to accomplish this end, and in certain appliances for feeding and watering the stock while the car is in motion, as will be hereinafter more fully described and claimed.

In the annexed drawings, in which similar letters indicate like parts in the several views, Figure 1 is an end view of my improved stock-car. Fig. 2 is a side view taken at one end of the car. Fig. 3 is a longitudinal section on the line $y\ y$ of Fig. 4, which latter figure represents a sectional plan, looking downward, on the line $x\ x$ of Fig. 3; and Fig. 5 is a cross-section on the line $z\ z$ of Fig. 2.

A represents the platform of the car, which supports the body or frame-work A', made of slats, in the usual manner, so as to permit the free access of light and air.

On each side of the car, at opposite ends, are doors B B, that are hung by loops or hooks $b\ b$ to a guide-rod, B', so as to slide readily along the same to open or close the entrance to the car. The doors B are fastened by means of the staples and hasps $b'\ b'$, which are secured together by simple bolts or pegs, or by an ordinary padlock, as may be found most desirable.

Within the car, and placed at proper intervals along its center line, are the posts or standards C C, that extend from bottom to top and afford a support for the hinged or swinging partitions C' C', secured thereto. These partitions are made in sections, so as to fold readily upon themselves and occupy a small space around the posts C when not in use, and when extended across the car so as to divide it into compartments they are held in place by means of the bolts $c\ c$, locking into the car-floor, and by the bolts $c'\ c'$, locking into the side pieces or standards, D. Owing to the manner in which these partitions are made and arranged, it will be seen that they can be readily operated so as to close the animals into their separate compartments as fast as they are driven into the car. These partitions may, if desired, be hinged to the sides of the car, instead of to the posts C, and locked to each other or to the posts C in the center.

Between the standards D, on each side of the car, are placed the troughs E, arranged at a suitable height for the convenience of the larger kinds of stock, while the wants of hogs and other small stock are supplied from the trough F, that extends along the floor of the car, on each side, below the troughs E.

The top of the car is provided with a water-tank, G, that extends along its entire length under the roof, and is supplied through suitable openings, $g$. This tank is so arranged as to be surrounded by an air-space, $g'$, that tends to prevent the freezing of the water in winter; and in order to accomplish this object more perfectly this space may, if desired, be filled with a suitable packing, $g''$.

If desired, the interior of the tank may be provided with suitable breakwaters to prevent the bursting of the tank from the rushing of the water in case of a sudden stoppage or start.

On each side of the water-tank G are suitable boxes or bins, H H, also extending the entire length of the car, and designed for the storage of hay and other feed for the stock transported in the car. The location of these bins on each side of the water-tank also tends to prevent the freezing of the water contained in the tank, and this effect is further increased by the warm exhalations arising from the live-stock within the car.

The car-roof I is provided with suitable capped openings, $i\ i\ i$, through which the tank and bins may be supplied.

It is obvious that the relative arrangement of the tank and bins may be reversed, if desired; but I prefer to arrange them as shown in the drawings.

The water-tank G is provided with pipes K K, that pass from each end of the tank and extend along each side of the car within the outer part of the bins H, where they are protected from freezing in cold weather by the hay contained in the bins. These pipes are provided with cocks k k, by means of which the water may be shut off from them whenever desired.

The troughs E are supplied with water from the pipes K by means of the downward-projecting pipes L L, which are represented in Fig. 2 as being provided with cocks l l, by means of which the supply of water to each trough may be regulated independently of the others; or the cocks l may be dispensed with and the troughs all supplied at once by turning the cocks k k. The lower troughs, F, are also supplied with water in a similar manner by a pipe, M, at each end of the car.

The feed-bins H are provided with openings leading to the funnels N, through which the feed passes to the troughs E. These funnels are each provided with two valves, n n, arranged one above the other at a suitable distance apart to inclose between them a certain measure of feed, so that the quantity fed to each animal can be properly regulated. It will be seen that by opening the upper valve while the lower one is closed the feed will pass to the lower part of the funnel and rest upon the lower valve. By now closing the upper valve and opening the lower one the feed resting between the valves will pass into the troughs in definite quantities.

The valves n n, attached to each funnel, may be separately operated from the side of the car, as represented in Fig. 5; or the valves attached to all the funnels may be simultaneously operated from the end of the car by means of the rods or handles n' n', as represented in the other figures. When these valves are operated from the side of the car to supply each trough separately, a hinged foot-board, O, that extends along the outside of the platform, is provided for the attendant. This foot-board is supported by chains o, and is arranged to fold up against the side of the car when not in use. It may be operated by means of the lever P, attached to the end of the car, or, if desired, may be arranged to operate automatically by means of a weight, Q, attached to the chain o, which passes over a pulley, R, secured to the side of the car. In the latter case the weight Q holds the foot-board up against the car when not in use, but allows it to fall outward when pressed upon by the foot of the attendant.

If desired, the car may be provided with several floors or decks, each furnished with my improved appliances for confining and caring for live-stock during transportation.

Having thus described my invention, what I claim as new, and desire to secure by Letters Patent, is—

1. In a stock-car, the combination, with the central posts, C, and side standards, D, of the folding partitions C', made in sections, hinged to each other and to the posts C, and provided with bolts c c', substantially as and for the purpose specified.

2. In a stock-car, the combination, with the water-tank G, surrounded by an air-space, g', and packing g'', of the pipes K K, having cocks k k, and branch pipes L L, substantially as set forth.

3. In a stock-car, the combination, with the hinged foot-board O, of the chains o, weight Q, and pulley R, substantially as and for the purpose described.

In testimony that I claim the foregoing as my own I have hereto affixed my signature in presence of two witnesses.

JOSIAH W. HUNT.

Witnesses:
JNO. M. RUSSELL,
L. GEIGER.